US012580892B2

(12) United States Patent
Vijayvargiya et al.

(10) Patent No.: US 12,580,892 B2
(45) Date of Patent: Mar. 17, 2026

(54) SECURITY POLICY ENFORCEMENT FOR ADDITIONAL INSTANCES OF AN APPLICATION

(71) Applicant: VMWARE, INC., Palo Alto, CA (US)

(72) Inventors: Shirish Vijayvargiya, Pune (IN); Vasantha Kumar Dhanasekar, Chennai (IN); Sriram Gopalakrishnan, Pune (IN)

(73) Assignee: VMware, Inc., Palo Alto, CA (US)

( * ) Notice: Subject to any disclaimer, the term of this patent is extended or adjusted under 35 U.S.C. 154(b) by 305 days.

(21) Appl. No.: 18/106,526

(22) Filed: Feb. 7, 2023

(65) Prior Publication Data

US 2024/0205191 A1      Jun. 20, 2024

(30) Foreign Application Priority Data

Dec. 19, 2022      (IN) .............................. 202241073579

(51) Int. Cl.
*H04L 9/40* (2022.01)
(52) U.S. Cl.
CPC .......... *H04L 63/0263* (2013.01); *H04L 63/20* (2013.01)
(58) Field of Classification Search
CPC ............................ H04L 63/0263; H04L 63/20

USPC .......................................................... 726/11
See application file for complete search history.

(56) References Cited

U.S. PATENT DOCUMENTS

| | | | | |
|---|---|---|---|---|
| 10,423,774 | B1 * | 9/2019 | Zelenov ................ | H04L 63/126 |
| 2018/0152417 | A1 * | 5/2018 | Jain ......................... | H04L 63/20 |
| 2022/0357973 | A1 * | 11/2022 | Vittorelli ............. | G06F 9/45533 |

* cited by examiner

*Primary Examiner* — Anthony D Brown
(74) *Attorney, Agent, or Firm* — King Intellectual Asset Management

(57) ABSTRACT

The disclosure provides an approach for firewall policy management. Embodiments include receiving, at a firewall from a first virtual computing instance (VCI), a registration request comprising a first identifier of the first VCI and a second identifier of a second VCI. Embodiments include determining, at the firewall, based on the second identifier included in the registration request, that the second VCI is associated with a network security policy at the firewall. Embodiments include applying, at the firewall, based on the first identifier included in the registration request, the network policy associated with the second VCI to the first VCI. Additionally, embodiments include allowing or disallowing network activity for the first VCI based on the applied network security policy.

20 Claims, 4 Drawing Sheets

SECURITY POLICY ENFORCEMENT FOR ADDITIONAL INSTANCES OF AN APPLICATION

RELATED APPLICATIONS

Benefit is claimed under 35 U.S.C. 119(a)-(d) to Foreign Application Serial No. 202241073579 filed in India entitled "SECURITY POLICY ENFORCEMENT FOR ADDITIONAL INSTANCES OF AN APPLICATION", on Dec. 19, 2022, by VMware, Inc., which is herein incorporated in its entirety by reference for all purposes.

BACKGROUND

In a data center (e.g., a public or private cloud environment), applications may run on virtual computing instances (VCIs), such as virtual machines (VMs), containers, or other virtualized endpoints. The VCIs may run on physical computing devices (e.g., referred to as host machines) in the data center. Further, multiple instances of an application can be run in the data center, such as by spawning additional VCIs on host machines, each VCI running an instance of the application. Multiple instances of an application can help handle a larger incoming load of requests to the application, as the requests can be load balanced to the multiple instances for parallel processing.

In certain cases, a data center is configured to provide auto scaling of instances of an application, such as based on incoming load on or traffic to the application. For example, additional VCIs running additional instances of the application may be spawned when needed to handle extra load. Further, when the load on the application reduces, some of these spawned VCIs may be terminated. In some cases, due to changing load, spawned VCIs may exist for a relatively short period of time.

In data centers, it is important to protect VCIs running in the data center using security policies, such as firewall policies. In particular, an unprotected VCI may be subject to attack, such as network attacks, that can expose data or bring down the VCI. In an example, VCIs may be protected using a firewall. For example, a firewall agent may be deployed and run in each VCI. The firewall agent is configured to capture network activity in the VCI and hold the network activity until a decision is received from the firewall as to whether the activity is deemed safe or not. The firewall agent passes information regarding the network activity to the firewall and receives a decision from the firewall as whether to allow the network activity or not, and the firewall agent accordingly allows or blocks the network activity within the VCI. The firewall itself may run within the VCI (e.g., as part of the firewall agent) or may run externally from the VCI. For example, the firewall may run within another VCI, such as a service VM, in a hypervisor, in a manager of the data center, etc. It is also possible for the agent to run outside the context of the VCI, somewhere along the datapath of traffic to and from the VCI.

In certain aspects, a VCI is configured to register with the firewall using a registration process. The firewall may further be configured to communicate with a policy manager, as part of the registration process of the VCI, to retrieve a firewall policy to apply to the VCI. The registration process, including the communication between the firewall and the policy manager to retrieve the firewall policy, can take time. Accordingly, during the registration process, the VCI may be unprotected by the firewall, as there is no firewall policy associated with the VCI prior to completion of registration of the VCI. Therefore, either the VCI may handle application requests without protection until registration is complete, which can lead to security issues, or the VCI may wait to handle application requests until registration is complete, which causes delay in availability of the VCI. Delay in availability of the VCI may be problematic where VCIs are spawned and terminated often and quickly. Further, running the VCI without protection may not be an option.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
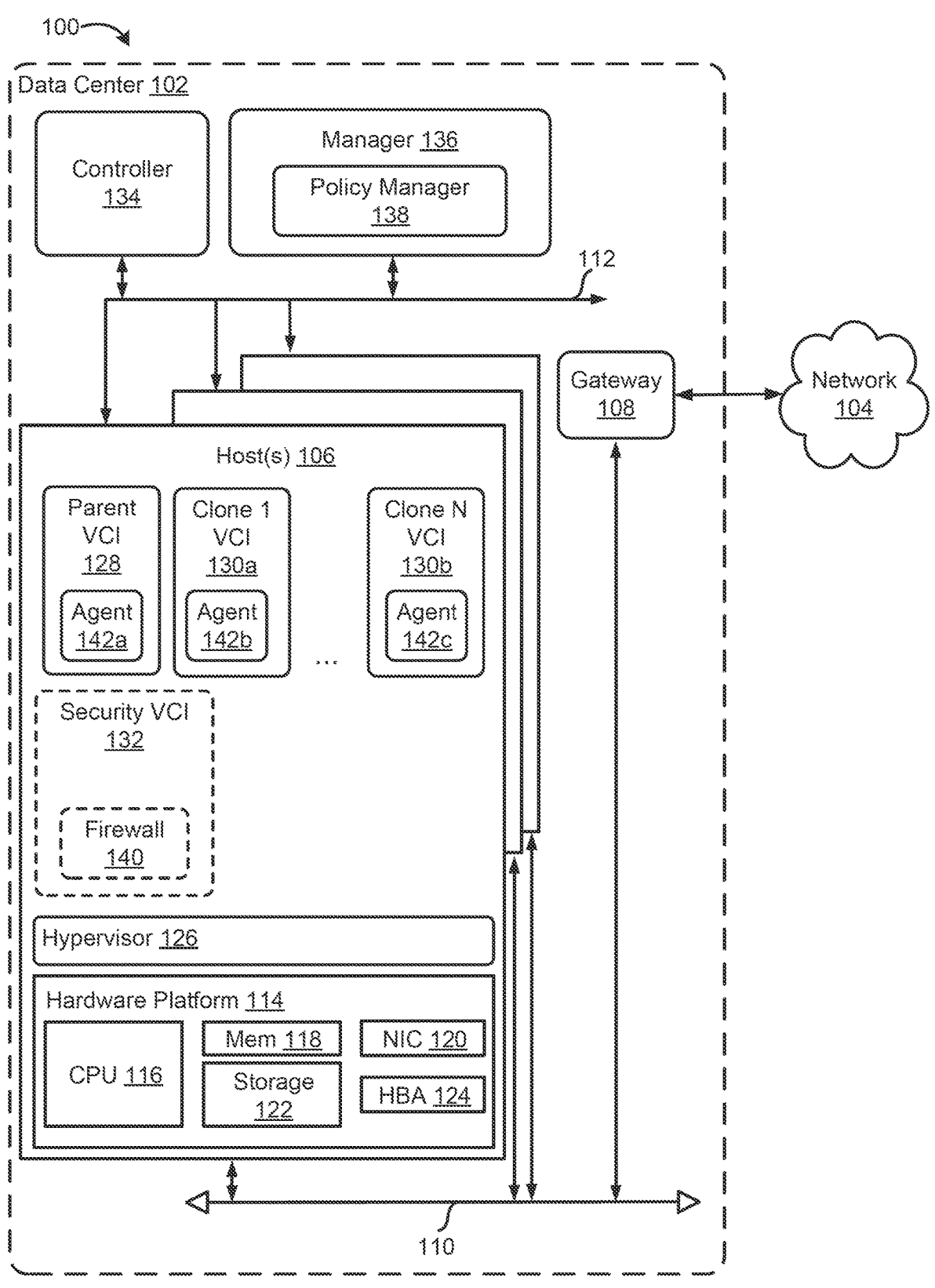
FIG. 1 depicts example physical and virtual network components with which embodiments of the present disclosure may be implemented.

The present disclosure describes an improved low-latency approach for applying security policies to VCIs spawned to run additional instances of an application for which the security policies are already applied. In particular, a security policy already applied to a previous VCI running an instance of an application may be instantly applied to a new VCI running another instance of the same application. While the present description relates primarily to firewall policies applied to VCIs, it should be understood that the techniques discussed may similarly be used for applying other types of security and network policies. Likewise, while the present description relates primarily to applying a security policy to a new VCI that is a clone of a previous VCI, it should be understood that the techniques discussed herein may similarly be used with respect to applying a security policy to a new VCI that inherits the security policy of a previous VCI and some data of the previous VCI including VCI identifier information as discussed herein, but the new VCI may not be an exact clone of the previous VCI. For example, the VCI identifier information of the previous VCI may be configured into the new VCI by an automated injection process, or manually. In this case, "cloning" a VCI relates to copying the VCI and then applying a new identity to the copy such as assigning new MAC address, new machine or container identifier, and so forth. It is also possible in some cases to clone a VCI by "forking" the parent, e.g., as described in U.S. Pat. No. 10,977,063, granted Apr. 13, 2021 and titled "Elastic Compute Fabric Using Virtual Machine Templates," the entirety of which is incorporated herein by reference. As the term is used herein, the word "clone" should be understood to represent a new instance of a parent VCI, generally for horizontal scaling of the application hosted by the parent and clone VCIs, regardless of the manner in which the new instance is created.

The cloned VCIs inherit information from the VCI being cloned (also referred to as a "parent VCI") to facilitate applying a firewall policy (also referred to as "network security policy") to the clone VCI. The firewall policy may be enforced on the clone VCI by permitting or denying network traffic to/from the clone VCI based on characteristics of the traffic in accordance with the policy. According to examples described herein, a clone VCI takes advantage of the fact that it is a clone of a parent VCI that has already registered with the firewall and that, as a clone, the same firewall policies that are applied to the parent VCI should be applied to the clone VCI. To do this, for example, a clone VCI, upon being spawned, detects that it is a clone and registers as a clone with the firewall. The firewall may then be able to apply the firewall policy associated with the parent VCI to the clone VCI, without having to retrieve the firewall policy from the policy manager, thereby reducing latency in the registration process.

Further, because of this association between clone VCI and parent VCI, if firewall policies change for the parent VCI, the changes can be automatically applied to any associated clone VCI, thereby simplifying the update of firewall policies for multiple VCIs running the same application.

FIG. 1 depicts example physical and virtual network components with which embodiments of the present disclosure may be implemented.

A networking environment 100 includes a data center 102 connected to a network 104. The network 104 is generally representative of a network of machines such as a local area network ("LAN") or a wide area network ("WAN"), a network of networks, such as the Internet, or any connection over which data may be transmitted.

The data center 102 generally represents a set of networked machines and may comprise a logical overlay network. The data center 102 includes host(s) 106, a gateway 108, a data network 110, which may be a Layer 3 network, and a management network 112. The data network 110 and management network 112 may be separate physical networks or different virtual local area networks (VLANs) on the same physical network.

It is noted that, while not shown, additional data centers may also be connected to the data center 102 via the network 104. Communication between the different data centers may be performed via gateways associated with the different data centers.

Each of the hosts 106 may include a server grade hardware platform 114, such as an x86 architecture platform. The hardware platform 114 of each of the hosts 106 includes components of a computing device such as one or more processors (CPUs) 116, a system memory 118, a network interface 120, a storage system 122, a host bus adapter (HBA) 124, and other I/O devices such as, for example, a mouse and keyboard (not shown). The CPU 116 is configured to execute instructions, for example, executable instructions that perform one or more operations described herein and that may be stored in the memory 118 and/or in the storage 122. The network interface 120 enables the host 106 to communicate with other devices via a communication medium, such as the data network 110 and/or the management network 112. The network interface 120 may include one or more network adapters or ports, also referred to as Network Interface Cards (NICs), for connecting to one or more physical networks. In some examples, the hosts 106 may be connected to each of the data network 110 and management network 112 via separate NICs or separate ports on the same NIC.

The gateway 108 manages external public IP addresses for host(s) 106 and routes traffic incoming to and outgoing from the data center 102 and provides networking services, such as, network address translation (NAT), dynamic host configuration protocol (DHCP), and load balancing. The gateway 108 uses the data network 110 to transmit data network packets to the hosts 106.

The hosts 106 may be geographically co-located servers on the same rack or on different racks. The hosts 106 are configured to provide a virtualization layer, also referred to as a hypervisor 126 that abstracts processor, memory, storage, and networking resources of hardware platform 114 for multiple virtual computing instances (VCIs) 128, 130a, 130b, and 132 that run concurrently on the same host 106. The VCIs 128, 130a, 130b, and 132 may include, for instance, VMs, containers, virtual appliances, and/or the like. The hypervisor 126 may run in conjunction with an operating system (not shown) in the host 106. In some examples, the hypervisor 126 is installed as system level software directly on hardware platform 114 of host 106 (often referred to as "bare metal" installation) and be conceptually interposed between the physical hardware and the guest operating systems executing in the VCIs 128, 130a, 130b, and 132. The term "operating system," as used herein, may refer to a hypervisor. The hypervisor 126 implements one or more logical entities, such as logical switches, routers, etc. as one or more virtual entities such as virtual switches, routers, etc. In some implementations, hypervisor 126 may comprise system level software as well as a "Domain 0" or "Root Partition" virtual machine (not shown) which is a privileged machine that has access to the physical hardware resources of the host. In this implementation, one or more of a virtual switch, virtual router, virtual tunnel endpoint (VTEP), etc., along with hardware drivers, may reside in the privileged virtual machine.

Controller 134 generally represents a control plane that manages configuration of the VCIs 128, 130a, 130b, and 132 within data center 102. The controller 134 may be a computer program that resides and executes in a central server in data center 102 or, alternatively, controller 134 may run as a virtual appliance (e.g., a VM) in one of the hosts 106. Although shown as a single unit, the controller 134 may be implemented as a distributed or clustered system. That is, the controller 134 may include multiple servers or virtual computing instances that implement controller functions. The controller 134 is associated with one or more virtual and/or physical CPUs (not shown). Processor(s) resources allotted or assigned to the controller 134 may be unique to the controller 134, or may be shared with other components of the data center 102. The controller 134 communicates with the hosts 106 via the management network 112.

A manager 136 represents a management plane comprising one or more computing devices responsible for receiving logical network configuration inputs, such as from a network administrator, defining one or more endpoints (e.g., VCIs and/or containers) and the connections between the endpoints, as well as rules governing communications between various endpoints. In some examples, the manager 136 is a computer program that executes in a central server in the networking environment 100, or alternatively, the manager 136 may run in a VCI, for example, in one of hosts 106. The manager 136 is configured to receive inputs from an administrator or other entity, via a web interface or API, and carry out administrative tasks for the data center 102, including centralized network management and providing an aggregated system view for a user. In some embodiments, the manager 136 comprises a virtualization manager, which is an application that provides an interface to the hardware platform 114. A virtualization manager is configured to carry out various tasks to manage virtual computing resources. For example, a virtualization manager can deploy VCIs in the data center 102 and/or perform other administrative tasks with respect to the VCIs.

In the illustrated example, the manager 136 includes a policy manager 138. The policy manager 138 stores and/or manages security policies (e.g., firewall policies, rules, and/ or the like) that are, for example, created by a system administrator, to govern the interactions of applications and/or services operating on the VCIs 128, 130a, 130b, and 132 with resources of the host 106, the gateway 108, other endpoints, etc. In certain aspects, the policy manager 138 stores and/or manages firewall policies that specify traffic handling in and out of the VCIs 128, 130a, and 130b. Firewall policies may be associated with different characteristics of the VCIs 128, 130b, 130b, and 132 that may be assigned when the VCI 128 is provisioned. The firewall policies may, for example, define allowed sources of packets, define allowed destinations of packets, define allowed protocols of the traffic, and/or allowable destination ports, etc. Different VCIs 128 may be associated with different firewall policies based on the applications operating on the VCIs 128, the names of the VCIs, a tenants or organizations associated with the VDIs, security tagging associated with the VCIs, or any other characteristic of the VDIs, or combinations thereof. The firewall policies may be expressed as a rule permitting or denying traffic to and/or from a set of VCIs sharing a set of characteristics or as rules permitting or denying traffic to and/or from a set of IP addresses and/or other packet header information corresponding to the VCIs. The translations of "policies" defined at the management layer that are associated with VCIs having a set of characteristics to "rules" associated with a set of IP addresses and/or other packet header information can happen at the management layer, by the firewall, and/or by another component such as a firewall agent. For the purposes of this document, the term "policies" encompass the forgoing types of policies/rules.

In the illustrated example, a parent VCI 128 is operating on the host 106. The parent VCI 128 may, for example, operate an application (e.g., a service) that receives and processes traffic (e.g., requests to the application in the form of one or more network packets). From time-to-time, to balance the load, manager 136 may spawn one or more clone VCIs 130 in data center 102 that also run the application, such that the traffic for the application can be load balanced between the multiple instances of the application on the multiple VCIs. Such load balancing may be performed by the gateway 108 for requests received via network 104, or other suitable load balancers (not shown). The process of spawning clone VCIs based on load to an application is sometimes referred to as "cloning" or "auto-scaling." When the load is reduced, manager 136 may terminate one or more of the clone VCI(s) 130. While, in the illustrated example, the clone VCIs 130 are operating on the same host 106 as the parent VCI 128, the clone VCIs 130 may be instantiated on any of the host(s) 106.

Agents 142a, 142b, and 142c (collectively "agents 142") operate on the VCIs 128, 130a, and 130b to, in part, manage the relationship between the VCIs and the firewall 140. For examples, an agent 142a operates on the parent VCI 128 and may be copied or otherwise installed as agents 142b and

142c onto the clone VCIs 130a and 130b as part of cloning. The agent 142a/142b/142c (i) registers the respective VCI 128/130a/130b with the firewall 140, and (ii) manages and/or reads/writes to a configuration file on respective VCI 128/130a/130b.

The configuration file of each respective VCI, in part, is configured to store a unique identifier (sometimes referred to as a "VCI ID" or "VCI_ID") associated with the respective VCI. In certain aspects, such as where the VCI is a VM, the unique identifier may be a BIOS identifier of the VM or a MAC address. In certain aspects, the VCI ID may be any value that uniquely identifies the VCI that (i) can be used to distinguish the parent VCI from the clone VCI, and (ii) can be used to register the VCI with the firewall. It should be noted that each VCI has its own unique identifier, such that a parent VCI and a clone of the parent VCI have different unique identifiers. The clone's identifier is typically assigned to the clone as part of the cloning process.

The configuration file is also configured to store a registration identifier (sometimes referred to herein as a "REG_ID") associated with the respective VCI. For example, when an agent, such as agent 142a, registers the VCI, such as parent VCI 128, with the firewall 140, as further discussed herein, the firewall 140 returns to the agent a REG_ID associated with that registration.

Where the VCI is not a clone VCI, such as for parent VCI 128, agent 142a creates the configuration file, determines the VCI ID of the VCI, such as via a call to an operating system associated with the VCI, and stores the VCI ID in the configuration file of parent VCI 128. Further, after registration with firewall 140, the agent 142a stores the REG_ID in the configuration file of parent VCI 128.

Where the VCI is a clone VCI, such as for clone VCI 130a, the configuration file of parent VCI 128 is copied onto the clone VCI 130a as part of the cloning process. Accordingly, this copied configuration file on clone VCI 130a includes the VCI ID of the parent VCI 128 from which it was cloned, as well as the REG_ID of the parent VCI 128 from which it was cloned. As described below, after clone VCI 130a is instantiated (e.g., after being cloned), the agent 142b compares the VCI_ID of clone VCI 130a to the VCI_ID recorded in the configuration file of clone VCI 130a to determine whether the current VCI is a clone. As the agent 142b determines the clone VCI 130a is a clone, the agent 142b stores the VCI ID of parent VCI 128 in the configuration file of clone VCI 130a as a parent VCI ID instead, and stores the VCI ID of clone VCI 130a as the VCI ID in the configuration file of clone VCI 130a. Similarly, the agent 142 stores the REG ID of parent VCI 128 in the configuration file of clone VCI 130a as a parent REG ID instead, and after registering clone VCI 130a with firewall 140, stores the REG ID of clone VCI 130a as the REG ID in the configuration file of clone VCI 130a.

In the illustrated example, a security VCI 132 operates on the host 106. The security VCI 132 is a VCI that operates applications and services that protect the VCIs 128, 130a, and 130b operating on the hosts 106. In the illustrated example, a firewall 140 operates on the security VCI 132. In some examples, the agents 142a, 142b, and 142c operating on the VCIs 128, 130a, and 130b may intercept network activity at the respective VCIs 128, 130a, and 130b (e.g., ingress and/or egress packets) and not allow the network activity to continue until receiving a security determination from the firewall 140 based on firewall policy. For example, the agent 142a/142b/142c sends information regarding network activity at the corresponding VCI 128/130a/130b to the firewall 140, and the firewall 140 communicates a response of whether to allow the network activity or not to the agent 142a/142b/142c. The agent 142a/142b/142c, based on the response, allows or does not allow the network activity. Though firewall 140 is shown running in the security VCI 132, it may run in any suitable location, such as within the same VCI 128/130a/130b as the agent 142a/142b/142c, on hypervisor 126, on another host 106, etc.

Further, another implementation of firewall 140 may be within a data path of network traffic of a VCI 128/130a/130b. For example, the firewall 140 may operate in conjunction with a virtual switch (not shown) on the hypervisor 126 to which VCI 128/130a/130b is connected, a physical switch, or another network entity in a data path of the VCI 128/130a/130b. In such an implementation, the agent 142a/142b/142c itself may not be the component in the host 106 that holds network activity at the corresponding VCI 128/130a/130b, but rather firewall policies are enforced on traffic with the VCI 128/130a/130b as a source or destination by the firewall 140 at the network entity in the data path of VCI 128, 130a, and 130b, such as at a virtual or physical switch within the host 106.

In certain aspects, the firewall 140 communicates with the policy manager 138 to receive or otherwise retrieve firewall policy for parent VCI 128 in response to parent VCI 128 registering with the firewall 140.

Figure 2:
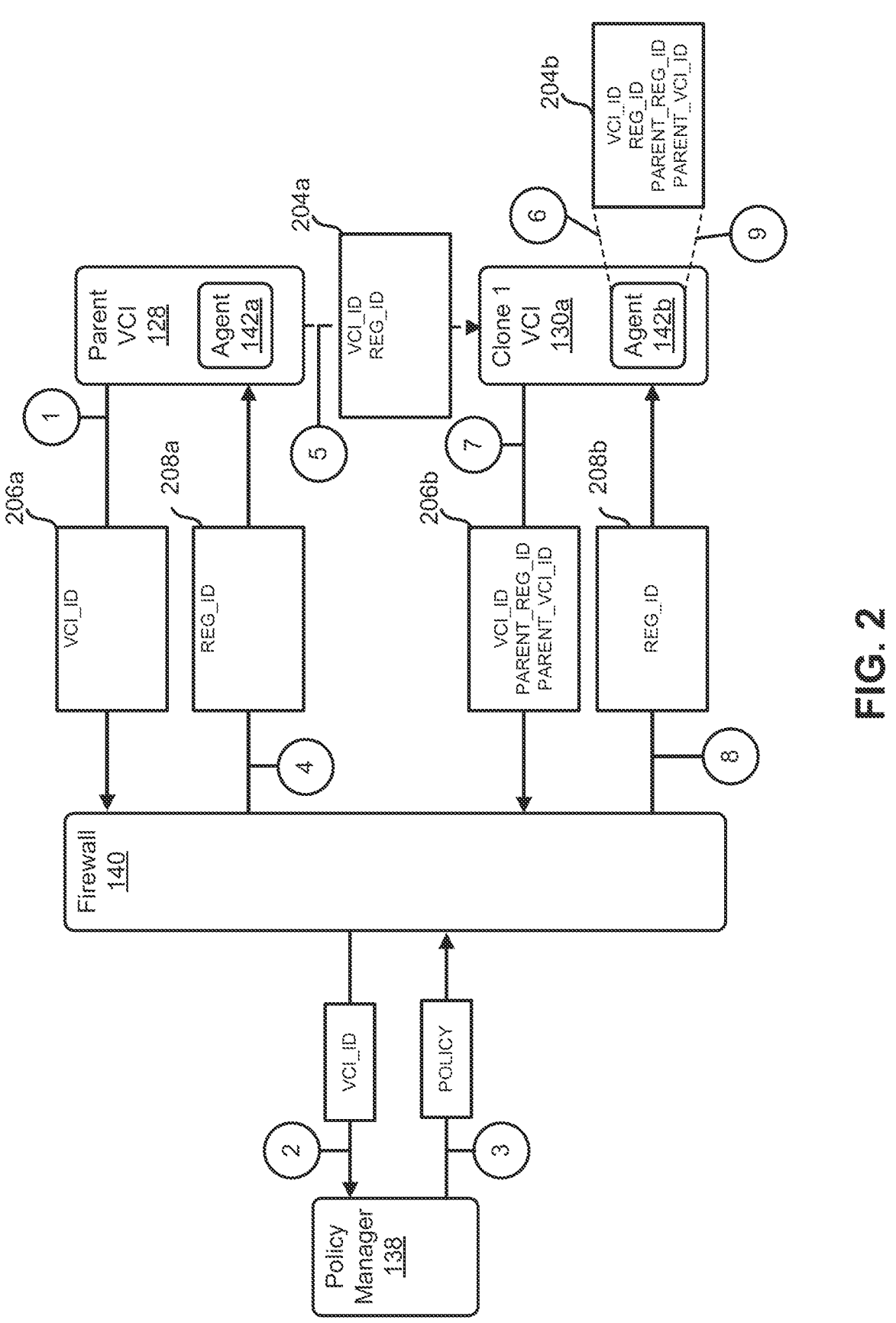
FIG. 2 illustrates a block diagram of the physical and virtual network components assigning firewall policies to virtual computing instances (VCIs) spawned due to auto-scaling events, according to embodiments of the present disclosure.

FIG. 2 illustrates a block diagram of an example dataflow to and from the firewall 140 to apply firewall policies to the network traffic of VCIs 128 and 130a. For example, the parent VCI 128 may be operating in the network environment 100 and, at a future point, the manager 136 may instantiate the clone VCI 130a in response to increased network traffic and/or processing load on the parent VCI 128. In the illustrated example of FIG. 2, VCI 128 and VCI 130a maintain (e.g., via the agent 142a and 142b, respectively) configuration file 204a and configuration file 204b, respectively, as discussed.

Initially, upon instantiation of parent VCI 128, the agent 142a operating on parent VCI 128 determines whether a configuration file 204a already exists on parent VCI 128, and if so, whether the actual VCI ID of the parent VCI 128 is the same as the VCI ID stored in configuration file 204a. In the illustrated example, the configuration file 204a does not yet exist or the two VCI IDs are the same for the parent VCI 128 because parent VCI 128 is not a clone. Where the configuration file 204a does not exists, agent 142a creates the configuration file 204a and writes the VCI ID of parent VCI 128 to the configuration file 204a.

The agent 142a then proceeds to register parent VCI 128 with firewall 140. As an example first step in the example dataflow, the agent 142a sends a registration message 206a to the firewall 140. Based on the parent VCI 128 not being a clone VCI, the registration message 206a includes the actual VCI ID of parent VCI 128 and may not include other VCI IDs or REG_IDs.

The firewall 140 receives the registration message 206a and determines that it does not currently have a firewall policy associated with parent VCI 128, such as based on the registration message not including another VCI ID or REG ID. Accordingly, at a second step, firewall 140 sends a request for a firewall policy associated with the VCI ID of parent VCI 128 to the policy manager 138. In particular, the firewall 140 sends a request message to the policy manager 138 including the VCI ID of parent VCI 128 from the registration message 206a.

Based on receiving the request message from firewall 140, policy manager 138 determines a firewall policy associated with the VCI ID of parent VCI 128 included in the request message. For example, the policy manager may have access to sets of firewall policies associated with VCI IDs, the association being defined by an administrator, for example. As an example third step in the example dataflow, the policy manager 138 sends the firewall policy associated with the VCI ID of parent VCI 128 to firewall 140 in response to the request message. The policy manager 138 may further include the VCI ID, included in the request message, in the response message to allow firewall 140 to determine to which VCI ID the firewall policy applies.

The firewall 140 registers the parent VCI 128 with the firewall 140 (e.g., associates the firewall policy with the parent VCI 128). Subsequently, as a fourth step in the example dataflow, the firewall 140 sends a response message 208a to the agent 142a with a REG_ID that uniquely identifies the parent VCI 128 with the firewall 140. The agent 142a subsequently stores the REG_ID in the configuration file 204a.

As an example fifth step in the example dataflow, a clone VCI 130a is instantiated, such as based on an auto-scaling event. During the cloning process, the clone VCI 130a is instantiated with a copy of the configuration file 204a of parent VCI 128, including the VCI ID and REG ID of parent VCI 128. The copy of configuration file 204a is shown as configuration file 204b.

As an example sixth step in the example dataflow, the agent 142b operating on the clone VCI 130a determines whether the actual VCI ID of the clone VCI 130a is the same as the VCI ID included in the configuration file 204b. In this instance, the two VCI IDs are not the same because the VCI ID currently in the configuration file 204b is the VCI ID of the parent VCI 128. Because the two VCI IDs are different, the agent 142b knows that the clone VCI 130a is a clone and that the VCI ID currently stored in the configuration file 204b is the VCI ID of the parent VCI 128. Accordingly, the agent 142b stores the VCI ID of parent VCI 128 in a different field of the configuration file 204b (sometimes referred to as a "parent VCI ID" or "PARENT_VCI_ID"). Further, the agent 142b stores the actual VCI ID of clone VCI 130a in configuration file 204b as the VCI ID. Agent 142b also stores the REG ID of parent VCI 128 in a different field of the configuration file 204b (sometimes referred to as a "parent registration identifier" or "PARENT_REG_ID").

As an example seventh step of the example dataflow, the agent 142b sends a registration message 206b to the firewall 140. Based on the clone VCI 130a being a clone VCI, the registration message 206b includes the VCI ID of clone VCI 130a as well as the PARENT_VCI_ID of the parent VCI 128 (and optionally the PARENT_REG_ID of parent VCI 128). Accordingly, in contrast to registration message 206a from parent VCI 128, which is not a clone, the registration message 206b from clone VCI 130 additionally includes the VCI ID of the parent VCI of the clone.

The firewall 140 receives the registration message 206b and determines that it stores a firewall policy associated with the parent VCI identified by the PARENT_VCI_ID (and/or PARENT_REG_ID) including in the registration message 206b. For example, firewall 140 attempts to match the PARENT_VCI_ID (and/or PARENT_REG_ID) to a firewall policy, and finds a stored match, such as based on the registration discussed of parent VCI 128. The firewall 140, therefore, further associates the clone VCI 130a with the same firewall policy as the parent VCI 128, and further associates the VCI ID of clone VCI 130a with the firewall policy, without retrieving the firewall policy from the policy manager 138. Accordingly, the firewall 140 is configured to apply the same firewall policy to traffic of clone VCI 130a as applied to traffic of parent VCI 128. At an eight step, the firewall 140 then sends a response message 208b to agent 142b with a REG_ID that uniquely identifies the clone VCI 130a with the firewall 140.

As an example ninth step of the example dataflow, the agent 142b stores the REG_ID associated with clone VCI 130a in the configuration file 204b. In certain aspects, agent 142b may further delete from the configuration file the PARENT_REG_ID and/or PARENT_VCI_ID.

Figure 3:
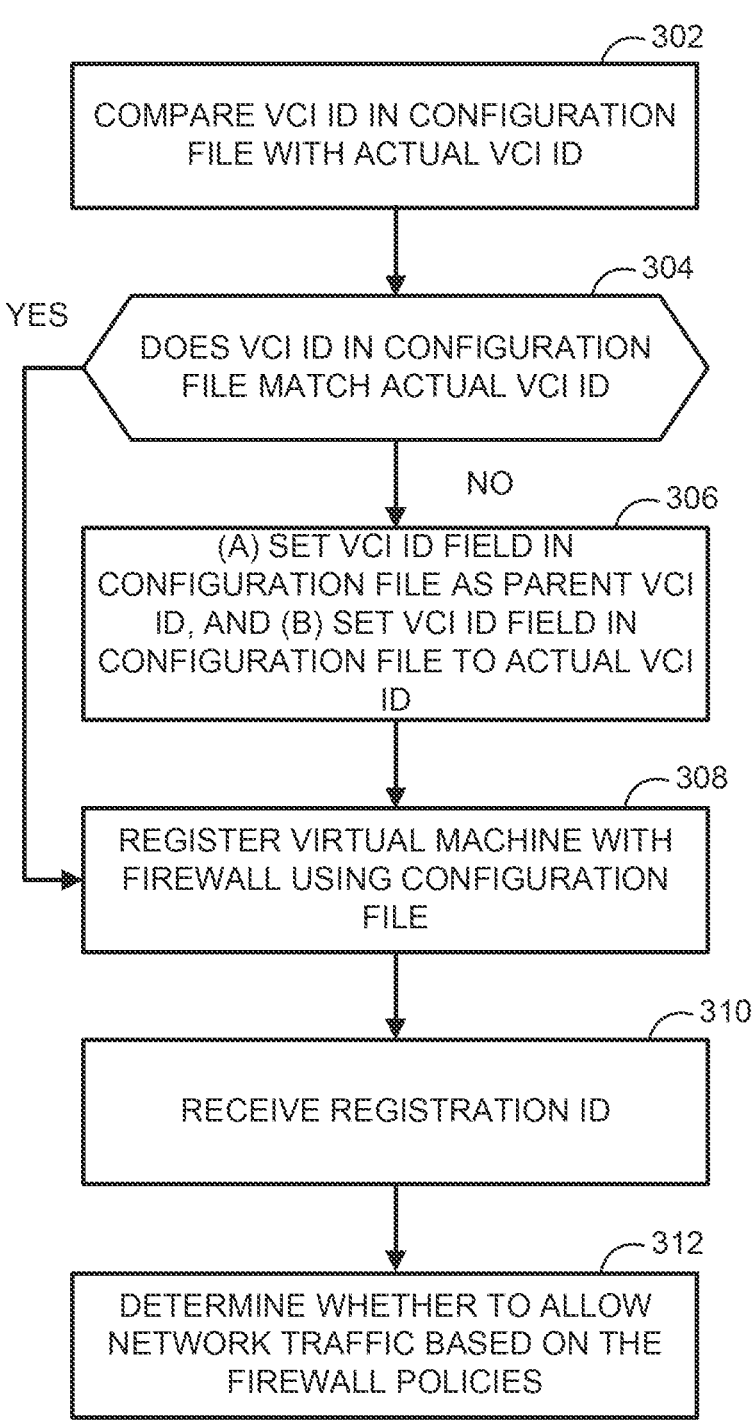
FIG. 3 is a flowchart of an example method for registering with a firewall, according to embodiments of the present disclosure.

FIG. 3 depicts example operations 300 related to firewall policy management. For example, operations 300 may be performed by one or more components of network environment 100 of FIG. 1. Operations 300 may correspond to certain aspects of the dataflow of FIG. 2, and provide additional detail of the logical operations and decisions performed. Operations 300 may begin when, for example, a VCI is instantiated, such as VCI 128/130a/130b of FIG. 1.

Operations 300 begin at step 302 with agent 142 within VCI 128/130a/130b comparing a VCI ID contained in a configuration file 204 maintained by the VCI 128/130a/130b with the actual VCI ID of the VCI 128/130a/130b (e.g., stored within the system files of the VCI 128/130a/130b).

Operations 300 continue at step 304 with determining, by the agent 142, whether the VCI ID in the configuration file 204 matches the actual VCI ID of the VCI 128/130a/130b.

When the two VCI IDs do not match, the VCI ID currently stored in the configuration file 204 is the VCI ID of a parent VCI of the VCI 128/130a/130b. As such, operations 300 continue to step 306 where the agent 142 (a) stores the VCI ID of the parent VCI as the parent VCI ID in the configuration file 204, and (b) stores the actual VCI ID of the VCI 128/130a/130b as the VCI ID in the configuration file 204.

Operations 300 continue at step 308 with registering, by the agent 142, the VCI 128/130a/130b with the firewall 140 using information from the configuration file 204. To register the VCI 128/130a/130b, the agent 142 may send registration message 206 to the firewall 140 with, for example, the VCI_ID of the VCI 128/130a/130b, and where the VCI is a clone the PARENT_VCI_ID. Registering the VCI 128/130a/130b with the firewall 140 causes, for example, the appropriate firewall policies to be applied to traffic with the VCI 128/130a/130b as a source or destination by the firewall 140. In some examples, the agent 140 also includes the PARENT_REG_ID in the registration message 206 as a confirmation that the clone VCI 130a is associated with a parent VCI 128 that is already registered with the firewall 140.

Operations 300 continue at step 310 the agent 142 receives a response message 208 including a registration identifier from the firewall 140. The agent 142 may then store the registration identifier in in the configuration file 204.

Operations 300 continue at step 312 with determining, by the firewall 140, whether to allow network traffic to and/or from VCI 128/130a/130b based on the firewall policies.

Figure 4:
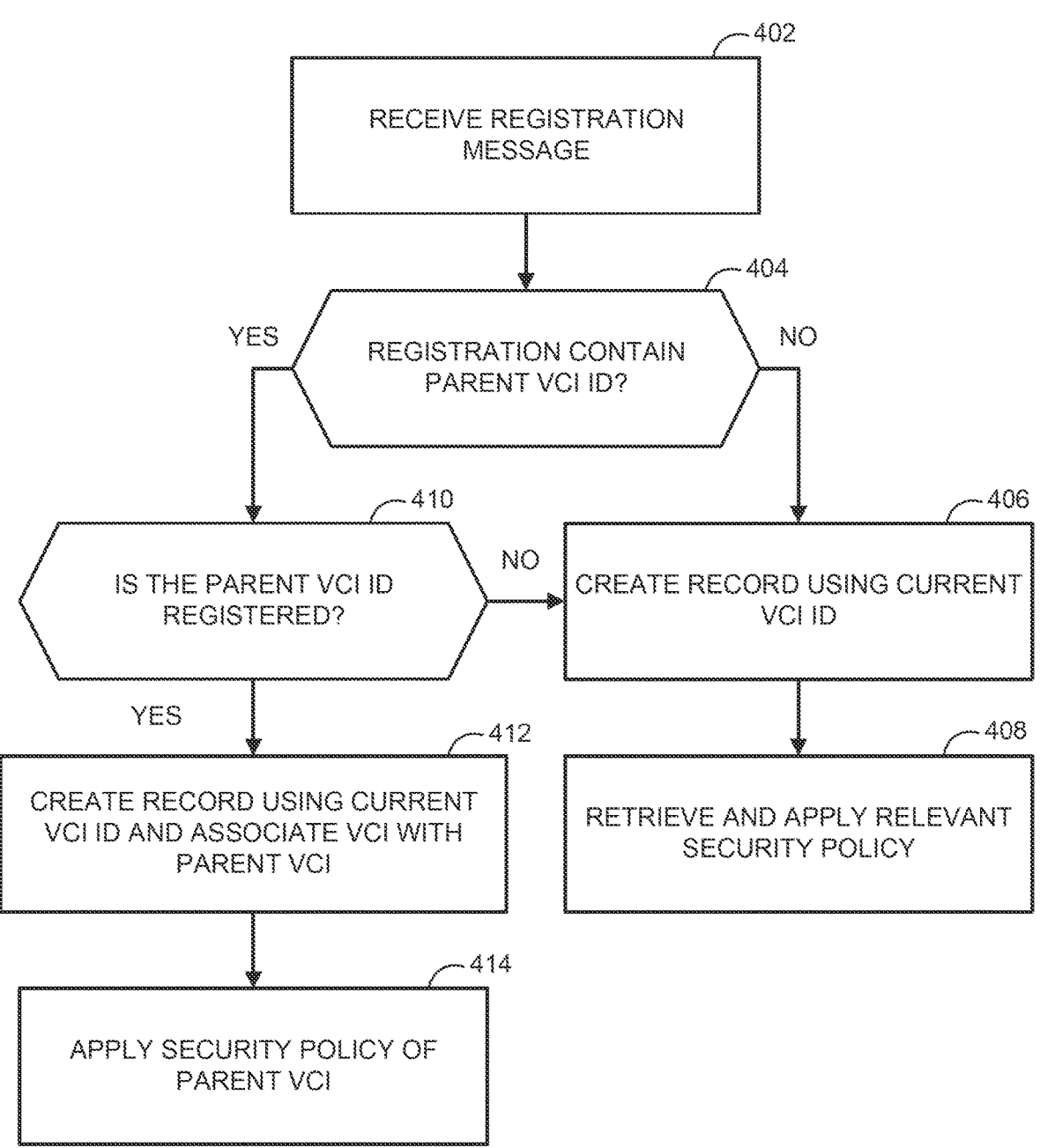
FIG. 4 is a flowchart for an example method for registering a VCI, according to embodiments of the present disclosure.

FIG. 4 depicts example operations 400 related to firewall policy management. For example, operations 400 may be performed by one or more components of network environment 100 of FIG. 1. Operations 400 may correspond to certain aspects of the dataflow of FIG. 2, and provide additional detail of the logical operations and decisions performed.

Operations 400 begin at step 402, with receiving, by firewall 140, a registration message 206 from a VCI 128/130a/130b.

Operations 400 continue at step 404 with determining, by the firewall 140, if the registration message 206 contains a parent VCI identifier.

When the registration message 206 does not contain a parent VCI identifier, operations 400 continue at step 406 with creating, by the firewall 140, a record and/or generating a registration identifier for the VCI 128/130a/130b associated with the VCI ID in the registration message 206.

Operations 400 then continue to step 408 with retrieving, by the firewall 140, firewall policy associated with the VCI ID from policy manager 138 to apply to the network traffic with the VCI 128/130a/130b as a source and/or as a destination.

When it is determined at step 404 that the registration message 206 contains a parent VCI ID, operations 400 continue at step 410 with determining, by the firewall 140, if the parent VCI ID is associated with a record stored by the firewall 140.

When the parent VCI ID is not associated with a record stored by the firewall, operations 400 continue to step 406 with creating, by the firewall 140, a record and/or generating a registration identifier for the VCI associated with the VCI ID in the registration message.

When the parent VCI ID is associated with a record stored by the firewall, operations 400 continue to step 412 with creating, by the firewall 140, a record and/or generating a registration identifier for the VCI ID and creating an association between the record for the VCI ID and the record for the parent VCI ID.

Operations 400 continue to step 414 with applying, by the firewall 140, the firewall policy associated with the parent VCI ID to the VCI 128/130a/130b (e.g., without retrieving the firewall policy from the policy manager).

The various embodiments described herein may employ various computer-implemented operations involving data stored in computer systems. For example, these operations may require physical manipulation of physical quantities-usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and/or the like.

One or more embodiments of the present invention may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for firewall policy enforcement, the method comprising:

receiving, at a firewall from a first virtual computing instance (VCI), a registration request comprising a first identifier of the first VCI and a second identifier of a second VCI;

determining, at the firewall, based on the second identifier included in the registration request, that the second VCI is associated with a network security policy at the firewall;

applying, at the firewall, based on the first identifier included in the registration request, the network security policy associated with the second VCI to the first VCI;

allowing or disallowing network activity for the first VCI based on the applied network security policy;

receiving, at the firewall from a third VCI, a second registration request comprising a third identifier of the third VCI;

determining, at the firewall, the third identifier is not associated with any of the network security policy at the firewall;

sending, from the firewall to a policy manager, a security policy request for the third VCI, the security policy request comprising the third identifier; and receiving, from the policy manager, a second network policy to apply to the third VCI.

2. The method of claim 1, wherein the first VCI is a clone of the second VCI.

3. The method of claim 1, wherein the first identifier comprises a first BIOS ID of the first VCI and the second identifier comprises a second BIOS ID of the second VCI.

4. The method of claim 1, wherein the firewall operates on a security VCI separate from the first, second and third VCIs.

5. The method of claim 1, wherein applying the network security policy associated with the second VCI to the first VCI further comprises creating an association between the first identifier of the first VCI and the second identifier of the second VCI.

6. The method of claim 1, wherein the second identifier comprises a registration identifier associated with the second VCI.

7. The method of claim 1, further comprising:

instantiating the first VCI by cloning the second VCI; and in response to the first VCI being instantiated, storing, by an agent operating on the first VCI, the first identifier as being associated with the first VCI and the second identifier as being associated with the second VCI.

8. A system for firewall policy enforcement, the system comprising:
at least one memory; and
at least one processor coupled to the at least one memory, the at least one processor and the at least one memory configured to:
receive, at a firewall from a first virtual computing instance (VCI), a registration request comprising a first identifier of the first VCI and a second identifier of a second VCI;
determine, at the firewall, based on the second identifier included in the registration request, that the second VCI is associated with a network security policy at the firewall;
apply, at the firewall, based on the first identifier included in the registration request, the network security policy associated with the second VCI to the first VCI;
allow or disallow network activity for the first VCI based on the applied network security policy;
receive, at the firewall from a third VCI, a second registration request comprising a third identifier of the third VCI;
determine, at the firewall, the third identifier is not associated with any of the network security policy at the firewall;
send, from the firewall to a policy manager, a security policy request for the third VCI, the security policy request comprising the third identifier; and
receive, from the policy manager, a second network policy to apply to the third VCI.

9. The system of claim 8, wherein the first VCI is a clone of the second VCI.

10. The system of claim 8, wherein the first identifier comprises a first BIOS ID of the first VCI and the second identifier comprises a second BIOS ID of the second VCI.

11. The system of claim 8, wherein the firewall operates on a security VCI separate from the first, second and third VCIs.

12. The system of claim 8, wherein to apply the network security policy associated with the second VCI to the first VCI, the at least one processor and the at least one memory are further configured to create an association between the first identifier of the first VCI and the second identifier of the second VCI.

13. The system of claim 8, wherein the second identifier comprises a registration identifier associated with the second VCI.

14. A non-transitory computer-readable medium storing instructions that, when executed by one or more processors, cause the one or more processors to:

receive, at a firewall from a first virtual computing instance (VCI), a registration request comprising a first identifier of the first VCI and a second identifier of a second VCI;
determine, at the firewall, based on the second identifier included in the registration request, that the second VCI is associated with a network security policy at the firewall;
apply, at the firewall, based on the first identifier included in the registration request, the network security policy associated with the second VCI to the first VCI;
allow or disallow network activity for the first VCI based on the applied network security policy;
receive, at the firewall from a third VCI, a second registration request comprising a third identifier of the third VCI;
determine, at the firewall, the third identifier is not associated with any network security policy at the firewall;
send, from the firewall to a policy manager, a security policy request for the third VCI, the security policy request comprising the third identifier; and
receive, from the policy manager, a second network policy to apply to the third VCI.

15. The computer-readable medium of claim 14, wherein the first VCI is a clone of the second VCI.

16. The computer-readable medium of claim 14, wherein the first identifier comprises a first BIOS ID of the first VCI and the second identifier comprises a second BIOS ID of the second VCI.

17. The computer-readable medium of claim 14, wherein the firewall operates on a security VCI separate from the first, second and third VCIs.

18. The computer-readable medium of claim 14, wherein to apply the network security policy associated with the second VCI to the first VCI, the instructions cause the one or more processors to create an association between the first identifier of the first VCI and the second identifier of the second VCI.

19. The computer-readable medium of claim 14, wherein the second identifier comprises a registration identifier associated with the second VCI.

20. The computer-readable medium of claim 14, wherein the instructions that, when executed by the one or more processors, further cause the one or more processors to:
instantiate the first VCI as a clone of the second VCI; and
in response to the first VCI being instantiated, store the first identifier as being associated with the first VCI and the second identifier as being associated with the second VCI.

* * * * *